(12) United States Patent
Sakai et al.

(10) Patent No.: US 9,768,723 B2
(45) Date of Patent: Sep. 19, 2017

(54) MOTOR DRIVE USING CAPACITOR

(71) Applicant: FANUC CORPORATION, Yamanashi (JP)

(72) Inventors: Koujirou Sakai, Yamanashi (JP); Shinichi Horikoshi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/008,578

(22) Filed: Jan. 28, 2016

(65) Prior Publication Data

US 2016/0226427 A1    Aug. 4, 2016

(30) Foreign Application Priority Data

Feb. 4, 2015   (JP) ................... 2015-020694

(51) Int. Cl.
*H02P 27/04*    (2016.01)
*H02M 7/219*    (2006.01)
(Continued)

(52) U.S. Cl.
CPC ............ *H02P 27/08* (2013.01); *H02M 1/32* (2013.01); *H02M 5/12* (2013.01); *H02M 5/4585* (2013.01); *H02P 2201/03* (2013.01)

(58) Field of Classification Search
USPC ........................................ 318/479, 494, 504
See application file for complete search history.

(56) References Cited

U.S. PATENT DOCUMENTS 5,675,483 A * 10/1997 Rademaker ......... H02M 1/4208
                                               363/21.12
5,926,381 A * 7/1999 Moriguchi ............. H02M 7/25
                                               363/132
(Continued)

FOREIGN PATENT DOCUMENTS

JP    2000236679 A    8/2000
JP    2004112888 A    4/2004
(Continued)

OTHER PUBLICATIONS

English Abstract and Machine Translation for Japanese Publication No. 2006-333683 A, published Dec. 7, 2006, 14 pgs.
(Continued)

*Primary Examiner* — Bentsu Ro
(74) *Attorney, Agent, or Firm* — Fredrikson & Byron P.A.

(57) ABSTRACT

A motor drive of an embodiment of the present invention includes a PWM converter for converting AC power inputted from a low voltage AC power source into DC power by PWM control, an inverter for converting the received DC power to AC power to drive a motor, and a capacitor connected between the PWM converter and the inverter. The PWM converter is operated so as to limit input and output currents or input and output power to predetermined values, and supplied from the low voltage AC power source with a lower voltage than a voltage required to drive the motor. The PWM converter boosts a DC link voltage being an output voltage to the voltage able to drive the motor, and thereby serves to increase the potential difference of the capacitor between charged and discharged states to reduce the capacitance of the capacitor.

4 Claims, 5 Drawing Sheets

(51) Int. Cl.
*H02P 27/08* (2006.01)
*H02M 1/32* (2007.01)
*H02M 5/12* (2006.01)
*H02M 5/458* (2006.01)

(56) References Cited

U.S. PATENT DOCUMENTS 6,023,416 A * 2/2000 Shikata ............... H02M 3/3376
363/134
6,137,233 A * 10/2000 Moisin .................. H05B 41/36
315/161
7,148,664 B2 * 12/2006 Takahashi ................ G05F 1/70
323/222

FOREIGN PATENT DOCUMENTS

JP 2006333683 A 12/2006
JP 4917680 B1 4/2012

OTHER PUBLICATIONS

English Abstract and Machine Translation for Japanese Publication No. 2004-112888 A, published Apr. 8, 2004, 8 pgs.
Untranslated Notification of Reasons for Refusal mailed by JPO, May 17, 2016, 3 pages.
English machine translation of Notification of Reasons for Refusal mailed by JPO, May 17 2016, 2016, 3 pages.
Untranslated Decision to Grant a Patent mailed by JPO, Aug. 2, 2016, 3 pages.
English machine translation of Decision to Grant a Patent mailed by JPO, Aug. 2, 2016, 3 pages.
English Abstract and Machine Translation for Japanese Publication No. 2000-236679 A, published Aug. 29, 2000, 10 pgs.
English Abstract and Machine Translation for Japanese Publication No. 4917680 B1, published Apr. 18, 2012, 14 pgs.

* cited by examiner

MOTOR DRIVE USING CAPACITOR

BACKGROUND OF THE INVENTION

1. Field of the Invention

The present invention relates to a motor drive, and in particular relates to a motor drive that uses a PWM converter and a capacitor to reduce peak power supplied from a power source when actuating a motor and peak power regenerated to the power source when decelerating the motor.

2. Description of Related Art

In motor drives for driving machine tools, industrial machines, robots, and the like, PWM converters that can boost a DC link voltage to a desired voltage of an input voltage peak value or more at a power factor of approximately 1 by a PWM switching operation of power semiconductor elements are widely used as converters to convert input alternating current power into direct current (DC) power.

For example, there is known a method in which a capacitor is connected to an output of the PWM converter, while the PWM converter is operated by a PWM switching operation so as to limit input and output currents, and the power of the capacitor is used for making up a shortage of power to drive a motor, for the purpose of reducing peak power supplied from a power source when accelerating the motor and peak power regenerated to the power source when decelerating the motor (for example, Japanese Unexamined Patent Publication (Kokai) No. 2000-236679).

Provided that the PWM converter limits input power to Y [W] with respect to power X [W] required to accelerate the motor, a power shortage Z [W], which is to be supplied from the capacitor, is represented by the following equation (1):

$$Z[W]=X[W]-Y[W] \quad (1)$$

When T [s] represents a motor acceleration period, energy E [J] to be supplied from the capacitor is represented by E [J]=Z [W]×T [s]. At this time, the voltage of the capacitor is reduced from V1 [V] to V2 [V] based on the following equation (2):

$$E[J]=\tfrac{1}{2}\times C\times(V1^2-V2^2) \quad (2)$$

Wherein V1 [V] represents a capacitor voltage before supplying the power, V2 [V] represents a capacitor voltage after supplying the power, and C [F] represents the capacitance of the capacitor.

The reduced capacitor voltage V2 [V] is brought back to the original voltage V1 [V] by being charged from the power source through the PWM converter or by being charged with regenerated power when decelerating the motor. Thus, the motor drive prepares for another power supply on the next acceleration of the motor (for example, Japanese Patent Publication No. 4917680).

The limitations of the input and output currents by the PWM switching operation of the PWM converter are achievable when the DC link voltage (=capacitor voltage) is higher than the input voltage peak value.

When the DC link voltage is equal to the input voltage peak value, current flows through diodes of the power semiconductor elements of the PWM converter to serve the power required to accelerate the motor, thus disabling the limitation of input power by the PWM switching operation. This operation is the same as that in a so-called diode rectifier converter.

In other words, it is assumed that when accelerating the motor, the capacitor has supplied power and the capacitor voltage has been reduced to the input voltage peak value. In this situation, a current starts flowing through the diodes of the PWM converter, thus resulting in an inability to limit input and output power. The total power required to accelerate the motor thereafter is supplied from the power source, and therefore the object to reduce the peak power cannot be achieved.

To avoid this problem, it is required that the capacitance C [F] be determined such that the capacitor voltage V2 after supplying the power is not reduced to the input voltage peak value. For example, the capacitance C [F] is determined by applying the following conditions to the equations (1) and (2).

X [W] and T [s]: determined from operating conditions of the motor.

Y [W]: limited to power that the power source is able to supply.

V1 [V]: required to be equal to or less than withstand voltages of the capacitor and the PWM converter.

V2 [V]: required to be equal to or more than the input voltage peak value and also equal to or more than a minimum voltage required to drive the motor.

It is apparent from the equation (2), to reduce the capacitance, a potential difference V1–V2 preferably increases. Also, since the capacitor is expensive and needs large installation space, the number of capacitors is preferably reduced.

Since V1 as an upper limit is determined depending on the withstand voltage of the capacitor and internal elements of the PWM converter, V1 cannot be raised higher. Since V2 as a lower limit is determined based on a source voltage, V2 depends on the power source to be installed.

For example, when V2 cannot be low by reason of a high source voltage or the like, the potential difference V1–V2 cannot increase, thus requiring the large capacitance C [F] of the capacitor. However, the potential difference V1–V2 preferably increases, as described above.

Also, when driving the motor, the PWM converter limits the input and output currents and the capacitor makes up the shortage. This consequently reduces power to be inputted to and outputted from the PWM converter, thus allowing to select a PWM converter having lower capacity than the output of the motor.

In the case of selecting the PWM converter having lower capacity than the output of the motor, however, if the output of the motor is higher than an assumed value or if the capacitance of the capacitor is reduced by aging, the capacitor voltage may fall short of the input voltage peak value when supplying the power to accelerate the motor, and thereby a motor load may be directly applied to the PWM converter and possibly damage the PWM converter.

SUMMARY OF THE INVENTION

Conventionally there is a problem that the capacitance of a capacitor cannot be reduced to reduce peak power supplied from a power source when actuating a motor and peak power regenerated to the power source when decelerating the motor.

A motor drive according to a first aspect of the invention includes a PWM converter for converting alternating current (AC) power inputted from a low voltage AC power source into direct current (DC) power by PWM control, an inverter for receiving the DC power and converting the DC power into AC power to drive a motor, and a capacitor connected between the PWM converter and the inverter. The PWM converter is operated so as to limit input and output currents or input and output power to predetermined values. The PWM converter is supplied from the low voltage AC power source with a lower voltage than a voltage required to drive the motor. The PWM converter boosts a DC link voltage, which is an output voltage, to the voltage able to drive the motor, and thereby serves to increase the potential difference of the capacitor between charged and discharged states to reduce the capacitance of the capacitor.

Also, a motor drive according to a second aspect of the invention includes a PWM converter for converting AC power inputted from an AC power source into DC power by PWM control, an inverter for receiving the DC power and converting the DC power into AC power to drive a motor, a capacitor connected between the PWM converter and the inverter, and a step-down transformer connected between the AC power source and the PWM converter. The PWM converter is operated so as to limit input and output currents or input and output power to predetermined values. The PWM converter is supplied from the step-down transformer with a lower voltage than the voltage of the AC power source. The PWM converter serves to increase the potential difference of the capacitor between charged and discharged states to reduce the capacitance of the capacitor.

BRIEF DESCRIPTION OF THE DRAWINGS

The objects, features, and advantages of the present invention will be more apparent from the following description of embodiments in conjunction with the attached drawings, wherein.

DETAILED DESCRIPTION OF THE INVENTION

A motor drive according to the present invention will be hereinafter described with reference to the drawings.

[First Embodiment]

Figure 1:
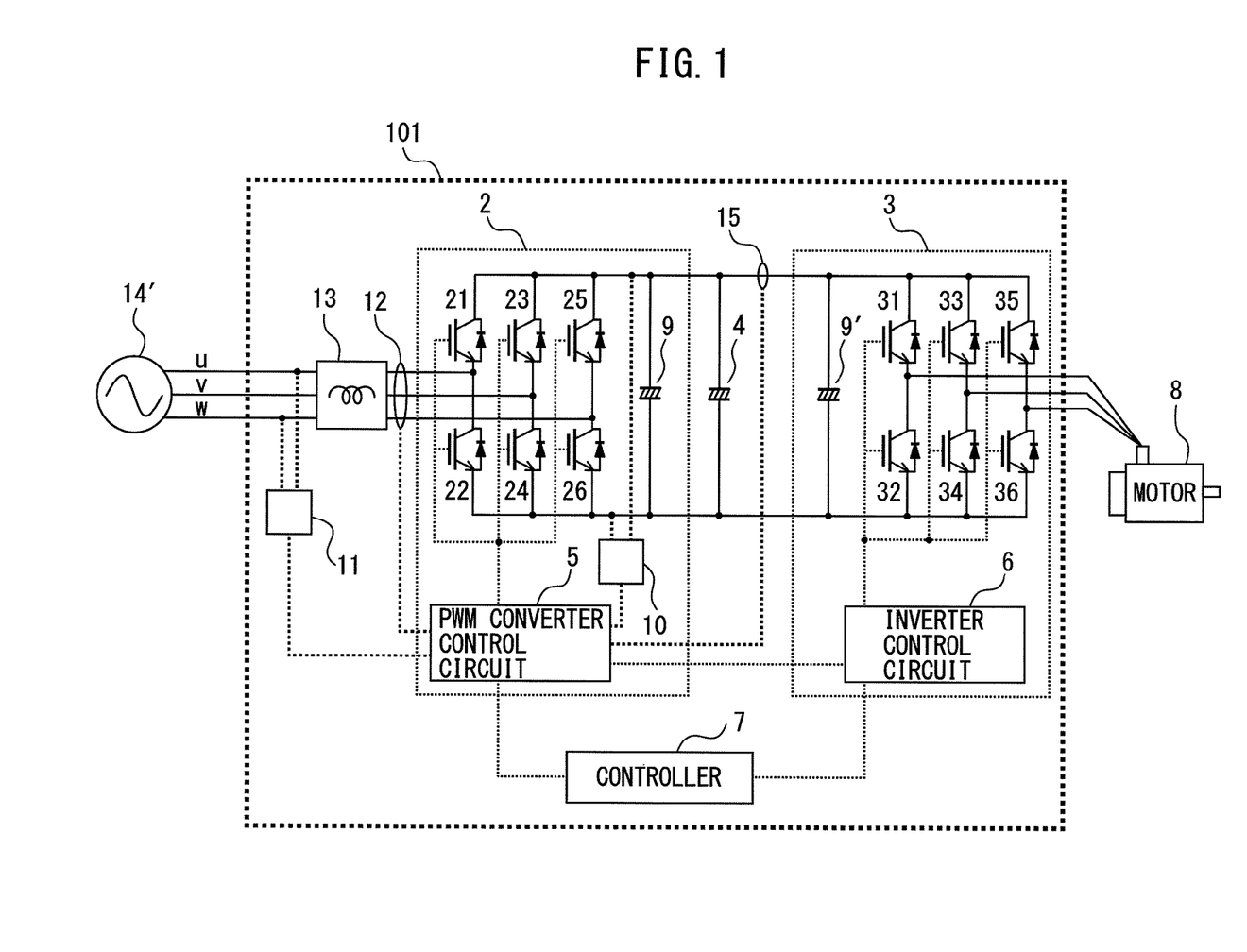
FIG. 1 is a block diagram of a motor drive according to a first embodiment of the present invention.

First, a motor drive according to a first embodiment will be described. FIG. 1 is a block diagram of the motor drive according to the first embodiment of the present invention. A motor drive 101 according to the first embodiment of the present invention includes a PWM converter 2 for converting alternating current (AC) power inputted from a low voltage AC power source 14' into direct current (DC) power by PWM control, an inverter 3 for receiving the DC power and converting the received DC power into AC power to drive a motor 8, and a capacitor 4 connected between the PWM converter 2 and the inverter 3. The PWM converter 2 is operated so as to limit input and output currents or input and output power to predetermined values. The PWM converter 2 is supplied from the low voltage AC power source 14' with a lower voltage than a voltage required to drive the motor 8. The PWM converter 2 boosts a DC link voltage being an output voltage to the voltage able to drive the motor 8, and thereby serves to increase the potential difference of the capacitor 4 between charged and discharged states to reduce the capacitance of the capacitor 4.

As shown in FIG. 1, the low voltage AC power source 14' is a three-phase AC power source, and supplies the AC power to the PWM converter 2 through an AC reactor 13. An input voltage detector 11 detects the AC power supplied from the low voltage AC power source 14'. An input current detector 12 detects a current to be inputted to the PWM converter 2 through the AC reactor 13.

A PWM converter control circuit 5 controls the switching of semiconductor switching elements 21 to 26 of the PWM converter 2 so as to convert the AC power inputted to the PWM converter 2 into the DC power. A DC voltage after the conversion is detected by an output voltage detector 10.

The DC power rectified by the PWM converter 2 is smoothed by a first smoothing capacitor 9 and a second smoothing capacitor 9', and inputted to the inverter 3. A current to be inputted to the inverter 3 is detected by an inverter input current detector 15. While the PWM converter 2 is operated so as to limit the input and output currents or the input and output power to the predetermined values, when actuating the motor 8, the capacitor 4 makes up a shortage owing to the limitations of the input and output currents by the PWM converter 2.

An inverter control circuit 6 controls the switching of semiconductor switching element 31 to 36 of the inverter 3 so as to convert the DC power inputted to the inverter 3 into the AC power to drive the motor 8. The PWM converter control circuit 5 and the inverter control circuit 6 are controlled by a controller 7.

In the motor drive 101 according to the first embodiment of the present invention, the motor drive 101 is connected to the low voltage AC power source 14', which is a power source of a lower voltage than a motor drive voltage. The PWM converter 2 boosts the DC link voltage to the motor drive voltage to drive the motor 8.

For example, there will be described a case in which a motor drive driven with AC 400 [V] is connected to an AC power source of AC 200 [V].

Conventionally, when the AC 400 [V] type motor drive is connected to the power source of AC 400 [V], an input voltage peak value is DC 566 [V] due to an input voltage of AC 400 [V], while V1 is assumed to be set at DC 800 [V] in consideration of withstand voltages of components. Thus, the capacitor is charged and discharged between V1: DC 800 [V] and V2: DC 566 [V]. Wherein, V1 is a capacitor voltage [V] before supplying power, and V2 is a capacitor voltage [V] after supplying power.

On the other hand, in the motor drive according to the first embodiment of the present invention, in order to drive an AC 400 [V] type motor with the AC power source of AC 200 [V], a DC link voltage (=capacitor voltage) is boosted to DC 800 [V]. Thus, the AC 400 [V] type motor can be driven.

Also, since the input voltage peak value of the AC 200 [V] power source is DC 283 [V], the capacitor is charged and discharged between V1: DC 800 [V] and V2: DC 283 [V]. As a result, the capacitance C [F] required of the capacitor can be reduced by 43%, when compared to a conventional capacitance.

In fact, since the AC 400 [V] type motor could not possibly be driven with the DC link voltage (=capacitor voltage) reduced to DC 283 [V], V2 may be determined within a voltage range that is sure to drive the motor.

As described above, according to the motor drive of the first embodiment of the present invention, the motor can be driven with a low voltage, and concurrently the potential difference of the capacitor between charged and discharged states increases. This serves to reduce the capacitance of the capacitor.

[Second Embodiment]

Figure 2:
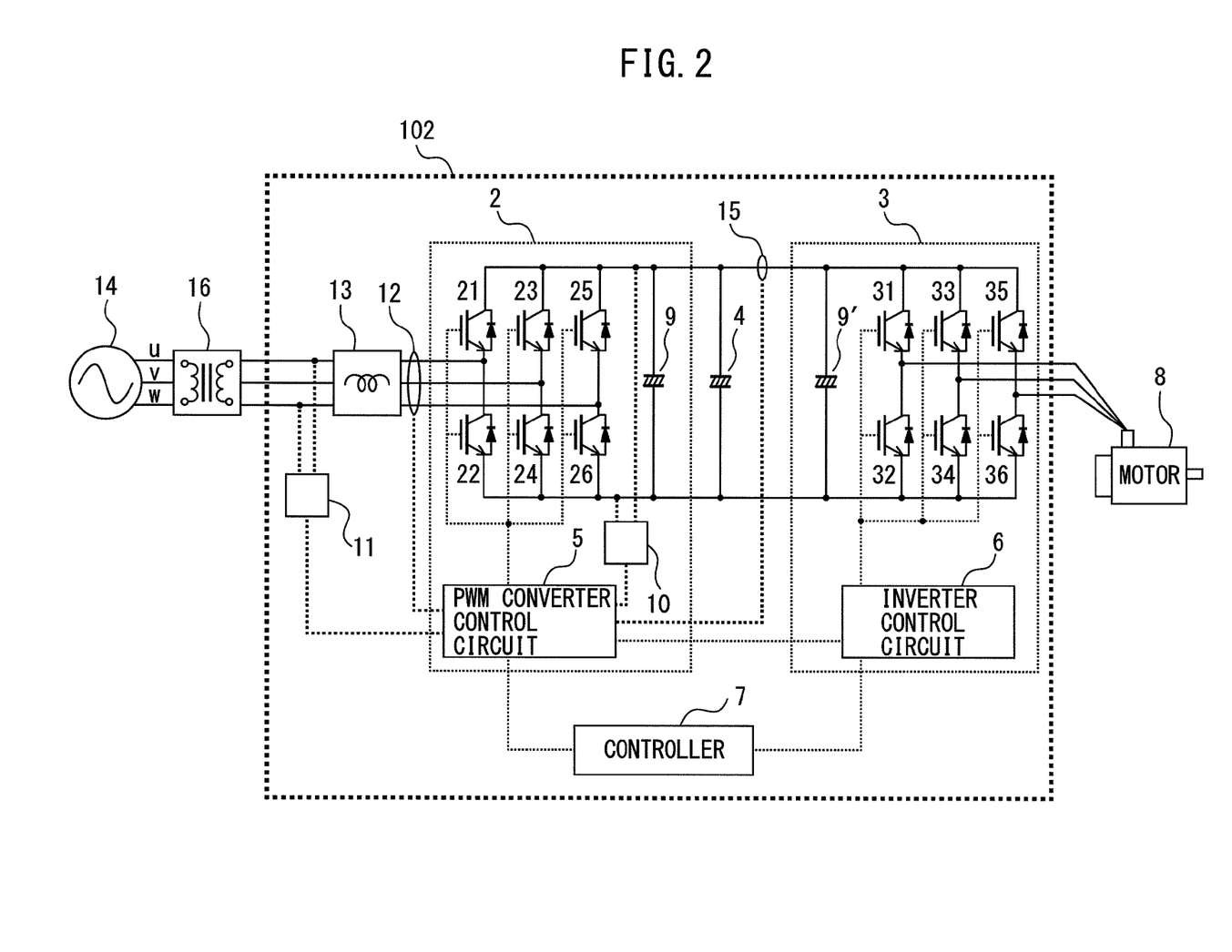
FIG. 2 is a block diagram of a motor drive according to a second embodiment of the present invention.

Next, a motor drive according to a second embodiment of the present invention will be described. FIG. 2 is a block diagram of the motor drive according to the second embodiment of the present invention. A motor drive 102 according to the second embodiment of the present invention includes a PWM converter 2 for converting AC power inputted from an AC power source 14 into DC power by PWM control, an inverter 3 for receiving the DC power and converting the received DC power into AC power to drive a motor 8, a capacitor 4 connected between the PWM converter 2 and the inverter 3, and a step-down transformer 16 connected between the AC power source 14 and the PWM converter 2. The PWM converter 2 is supplied from the step-down transformer 16 with a lower voltage than a voltage of the AC power source 14 and operated so as to limit input and output currents or input and output power to predetermined values, and thereby serves to increase the potential difference of the capacitor 4 between charged and discharged states to reduce the capacitance of the capacitor 4.

As shown in FIG. 2, the AC power source 14 is a three-phase AC power source, and supplies the AC power to the PWM converter 2 through the step-down transformer 16 and an AC reactor 13. An input voltage detector 11 detects an AC voltage stepped down by the step-down transformer 16. An input current detector 12 detects a current to be inputted to the PWM converter 2 through the AC reactor 13.

A PWM converter control circuit 5 controls the switching of semiconductor switching elements 21 to 26 of the PWM converter 2 so as to convert the AC power inputted to the PWM converter 2 into the DC power. A DC voltage after the conversion is detected by an output voltage detector 10.

The DC power rectified by the PWM converter 2 is smoothed by a first smoothing capacitor 9 and a second smoothing capacitor 9', and inputted to the inverter 3. A current to be inputted to the inverter 3 is detected by an inverter input current detector 15. While the PWM converter 2 is operated so as to limit the input and output currents or the input and output power to the predetermined values, when actuating the motor 8, the capacitor 4 makes up a shortage owing to the limitations of the input and output currents by the PWM converter 2.

An inverter control circuit 6 controls the switching of semiconductor switching element 31 to 36 of the inverter 3 so as to convert the DC power inputted to the inverter 3 into the AC power to drive the motor 8. The PWM converter control circuit 5 and the inverter control circuit 6 are controlled by a controller 7.

The step-down transformer 16 interposed between the AC power source 14 and the PWM converter 2 can step down the AC voltage to be inputted to the PWM converter 2. For example, there will be described a case in which the step-down transformer 16 steps down a source voltage of the AC power source 14 of AC 480 [V] to AC 380 [V].

Conventionally, when connecting the power source of AC 480 [V] without the interposition of the step-down transformer, it is assumed that the PWM converter boosts a no-load DC link voltage (=capacitor voltage) to DC 800 [V] in consideration of withstand voltages of components. Since the input voltage is AC 480 [V], an input voltage peak value is DC 680 [V], so that the capacitor is charged and discharged between V1: DC 800 [V] and V2: DC 680 [V]. Wherein, V1 is a capacitor voltage [V] before supplying power, and V2 is a capacitor voltage [V] after supplying power.

On the other hand, in the motor drive according to the second embodiment of the present invention, since the step-down transformer steps down the input voltage to AC 380 [V], an input voltage peak value to be inputted to the PWM converter is DC 540 [V]. Consequently, the capacitor is charged and discharged between V1: DC 800 [V] and V2: DC 540 [V]. The capacitance C [F] required of the capacitor can be reduced by 49%, when compared to a conventional capacitance.

Figure 3:
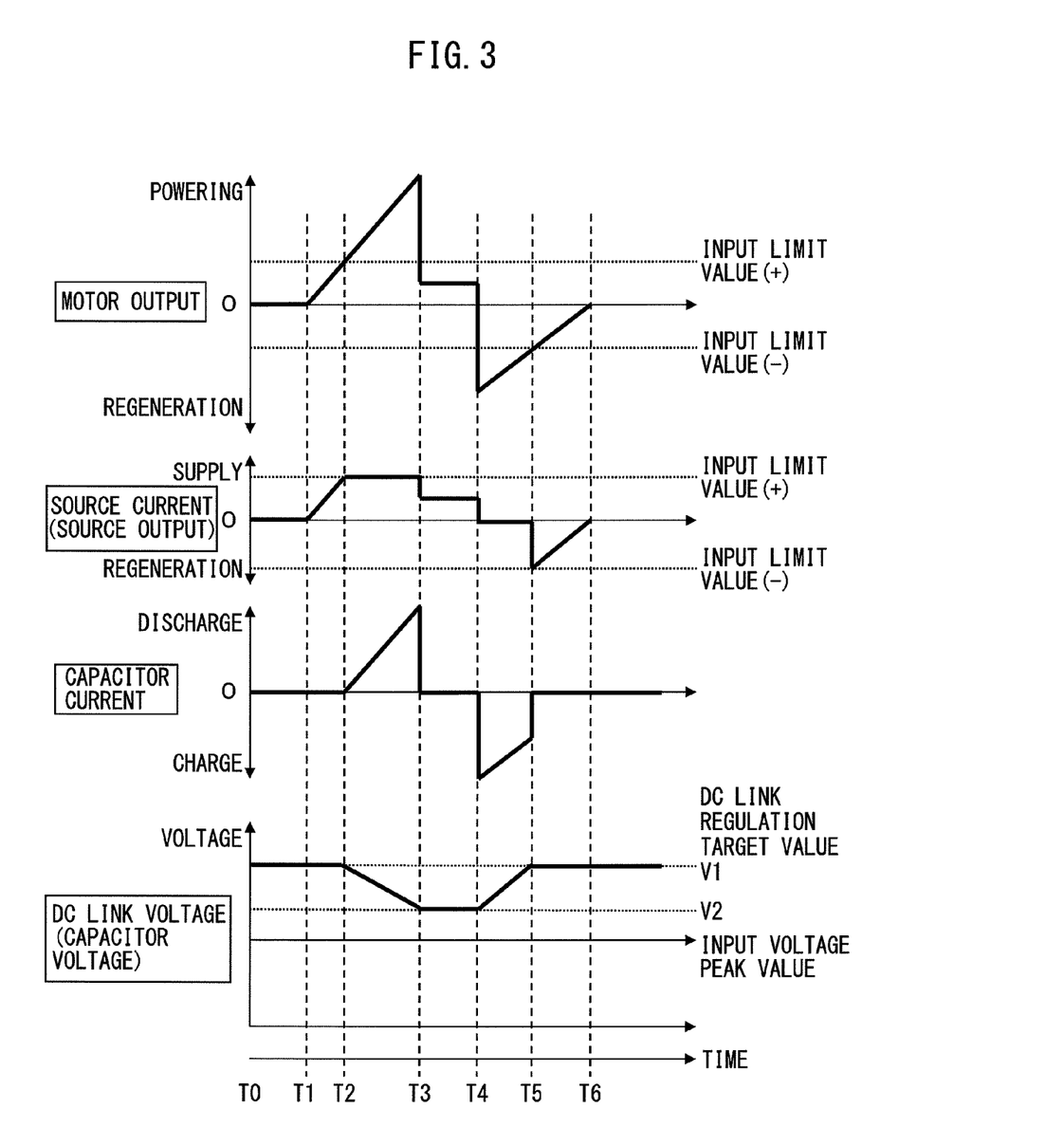
FIG. 3 is a timing diagram for explaining the operation of the motor drive according to the second embodiment of the present invention.

Next, an example of the operation of the motor drive according to the second embodiment of the present invention will be described. FIG. 3 is a timing diagram for explaining the operation of the motor drive according to the second embodiment of the present invention. FIG. 3 shows variations in each of a motor output, a source current (source output), a capacitor current, and a DC link voltage (capacitor voltage) with time from time T0 to time T6.

First, the operation from time T0 to time T1 will be described. In this period, the operation of the motor 8 is stopped. The PWM converter 2 regulates the DC link voltage (the voltage of the capacitor 4) at a constant voltage V1 that is higher than the input voltage peak value.

Next, the operation from time T1 to time T2 will be described. At time T1, the motor 8 starts to accelerate. Since the output of the motor 8 is equal to or less than an input current limit value of the PWM converter 2, a current is supplied from the AC power source 14. It is assumed that the input current limit value has been determined in advance.

Next, the operation from time T2 to time T3 will be described. Since the current supplied from the AC power source 14 has increased to the input current limit value or more, the PWM converter 2 limits the input current. The capacitor 4 supplies a current of the input current limit value or more. In accordance with this, the voltage of the capacitor 4 decreases. It is important that the voltage of the capacitor 4 does not decrease to the input voltage peak value or less.

Next, the operation from time T3 to time T4 will be described. The motor 8 is rotating at a constant speed, and at such light load the output of the motor 8 is equal to or less than the input current limit value of the PWM converter 2. Thus, a current is supplied from the AC power source 14 through the PWM converter 2.

Next, the operation from time T4 to time T5 will be described. At time T4, the motor 8 starts to decelerate. The capacitor 4 is charged with a regenerative current. As a result, the voltage of the capacitor 4 increases.

Next, the operation from time T5 to time T6 will be described. When, due to the increase in the voltage of the capacitor 4, the DC link voltage increases beyond a regulation target value V1, the regenerated power is regenerated to the input power source by the PWM converter 2.

As described above, according to the motor drive of the second embodiment of the present invention, since the step-down transformer is provided at an input part of the PWM converter to reduce the voltage of the input part of the PWM converter, the capacitor voltage V2 in the discharged state is set low. By setting V2 at the low value, the potential difference V1−V2 increases, thus allowing the capacitance of the capacitor to be reduced.

[Third Embodiment]

Figure 4:
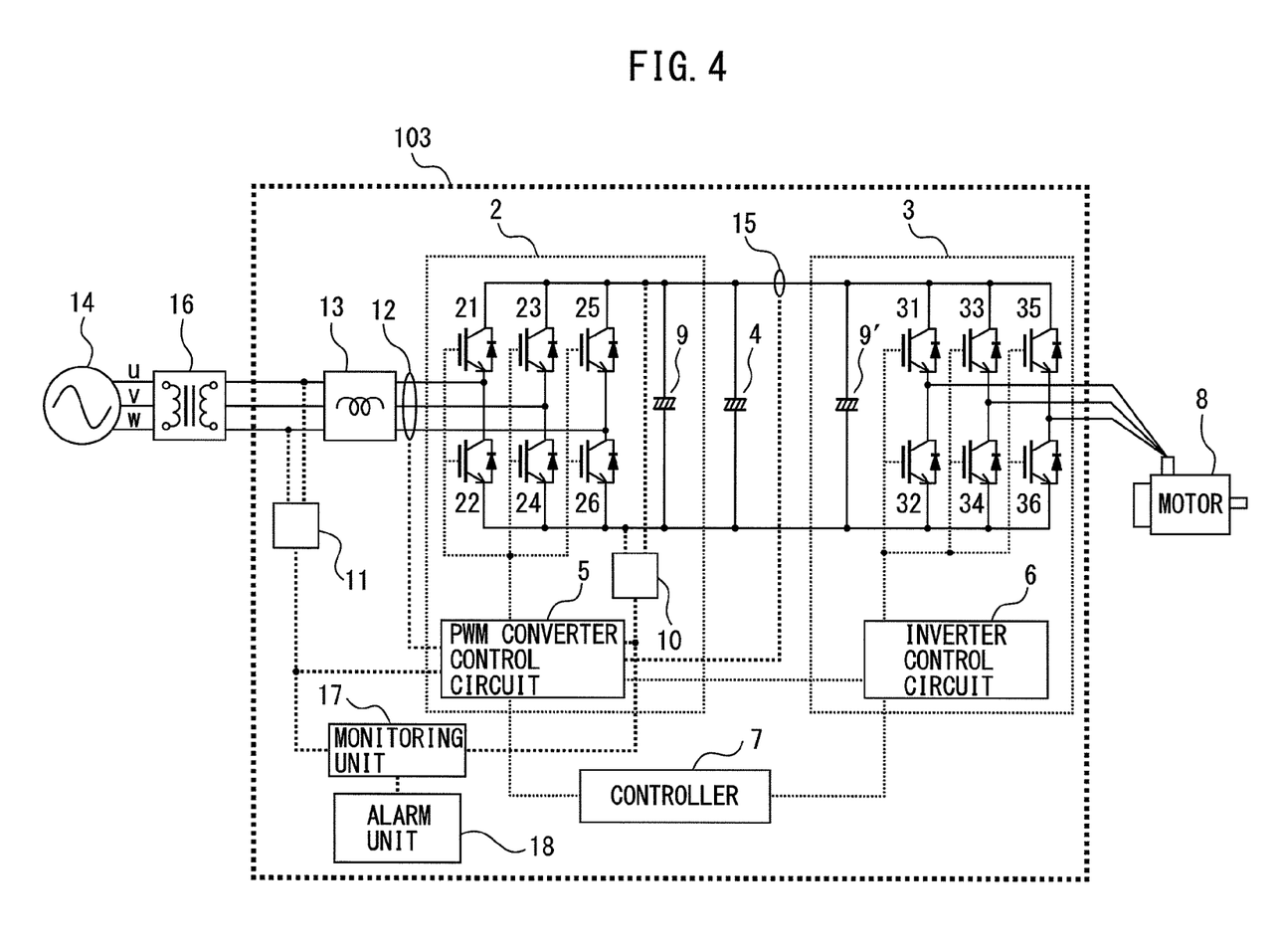
FIG. 4 is a block diagram of a motor drive according to a third embodiment of the present invention.

Next, a motor drive according to a third embodiment of the present invention will be described. FIG. 4 is a block diagram of the motor drive according to the third embodiment of the present invention. The difference of a motor drive 103 according to the third embodiment of the present invention from the motor drive 102 according to the second embodiment of the present invention is that a PWM converter 2 includes a monitoring unit 17 for monitoring the voltage of a capacitor 4, and an alarm unit 18 that issues an alarm to stop a motor 8 when the voltage of the capacitor 4 is equal to or less than a value higher than an input voltage peak value, in order to protect the PWM converter 2 from an overload. The PWM converter 2 having a capacity less than the output of the motor is connected and operated so as to limit input and output currents or input and output power to predetermined values. The other configurations of the motor drive 103 according to the third embodiment are the same as those of the motor drive 102 according to the second embodiment, so the detailed description thereof will be omitted.

In the case of using the PWM converter having a capacity less than the output of the motor, if a capacitor voltage falls short of the input voltage peak value and a motor load is directly applied to the PWM converter when accelerating the motor, the PWM converter may possibly be damaged. According to the motor drive of the third embodiment of the present invention, the DC link voltage (=capacitor voltage) is monitored and the motor is stopped upon issuing the alarm, before the motor breaks.

Note that, FIG. 4 shows an example in which the monitoring unit 17 and the alarm unit 18 are provided in the PWM converter 2 of the motor drive 102 according to the second embodiment. However, instead of this, the monitoring unit 17 and the alarm unit 18 may be provided in the PWM converter 2 of the motor drive 101 according to the first embodiment.

[Fourth Embodiment]

Figure 5:
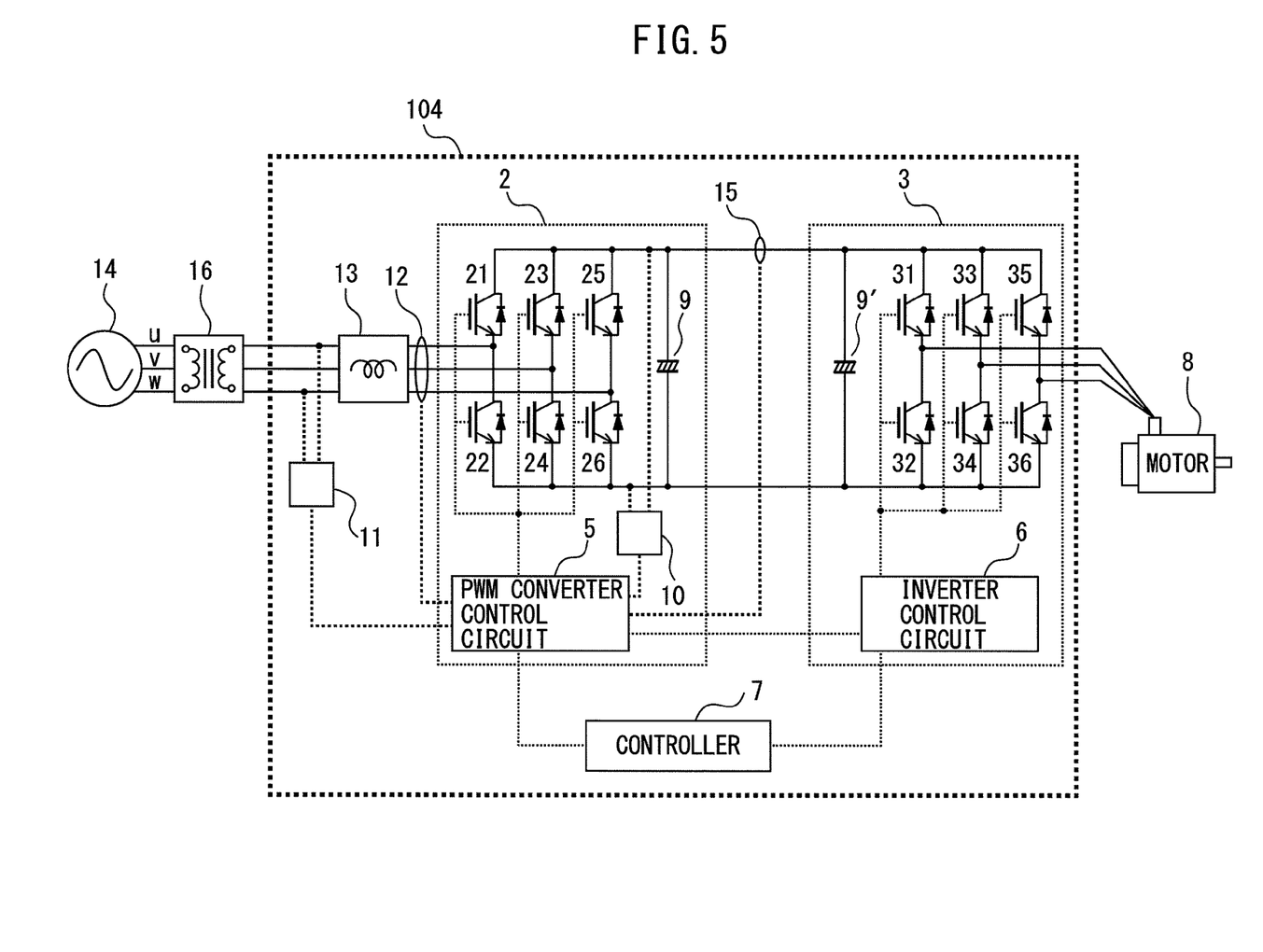
FIG. 5 is a block diagram of a motor drive according to a fourth embodiment of the present invention.

Next, a motor drive according to a fourth embodiment of the present invention will be described. FIG. 5 is a block diagram of the motor drive according to the fourth embodiment of the present invention. The difference of a motor drive 104 according to the fourth embodiment of the present invention from the motor drive 102 according to the second embodiment is that smoothing capacitors 9 and 9' are used instead of the capacitor 4. The other configurations of the motor drive 104 according to the fourth embodiment are the same as those of the motor drive 102 according to the second embodiment, so the detailed description thereof will be omitted.

The capacitor 4 connected to the motor drives according to the first to third embodiments of the present invention is assumed to be able to store energy to actuate the motor. For example, the capacitor 4 is a high capacitance electrolytic capacitor, an electric double layer capacitor, a lithium ion capacitor, or another high capacitance capacitor.

On the other hand, the motor drive according to the fourth embodiment of the present invention has the advantage that the use of energy stored in the first smoothing capacitor 9 and the second smoothing capacitor 9', instead of that in the capacitor 4, eliminates the need for providing the capacitor 4.

Note that, FIG. 5 shows an example in which the smoothing capacitors 9 and 9' are used instead of the capacitor 4 in the motor drive 102 according to the second embodiment. However, not limited to this, the smoothing capacitors 9 and 9' may be used instead of the capacitor 4 in the motor drive 101 according to the first embodiment or in the motor drive 103 according to the third embodiment.

As described above, according to the motor drives of the first to fourth embodiments, in a motor drive that uses a PWM converter and a capacitor for the purpose of reducing peak power supplied from a power source when actuating a motor and peak power regenerated to the power source when decelerating the motor, it is possible to reduce the capacitance of the capacitor by increasing the potential difference of the capacitor between charged and discharged states.

The invention claimed is:

1. A motor drive comprising:
a PWM converter configured to convert AC power inputted from a low voltage AC power source into DC power by PWM control;
an inverter configured to receive the DC power and converting the DC power into AC power to drive a motor;
a capacitor connected between the PWM converter and the inverter;
an input voltage detector configured to detect an AC voltage supplied from the low voltage AC power source to the PWM converter;
an input current detector configured to detect a current to be inputted from the low voltage AC power source to the PWM converter; and
an output voltage detector configured to detect a DC voltage converted by the PWM converter,
wherein the PWM converter is operated so as to limit input and output currents detected by the input current detector or input and output power detected by the input voltage detector, the input current detector and the output voltage detector to predetermined values,
wherein the PWM converter is supplied from the low voltage AC power source with a minimum voltage within a voltage range required to drive the motor or an AC voltage having peak value lower than the minimum voltage, and
wherein the PWM converter boosts a DC link voltage, which is an output voltage, to the voltage able to drive the motor, to reduce the capacitance of the capacitor.

2. The motor drive according to claim 1, wherein the PWM converter includes:
a monitoring unit configured to monitor the voltage of the capacitor; and
an alarm unit configured to issue an alarm to stop the motor, when the voltage of the capacitor is equal to or less than a certain value higher than an input voltage peak value, in order to protect the PWM converter from an overload.

3. The motor drive according to claim 1, wherein a smoothing capacitor is used instead of the capacitor.

4. A motor drive comprising:
a PWM converter configured to convert AC power inputted from an AC power source into DC power by PWM control;
an inverter configured to receive the DC power and converting the DC power into AC power to drive a motor;
a capacitor connected between the PWM converter and the inverter;
a step-down transformer connected between the AC power source and the PWM converter;
an input voltage detector configured to detect an AC voltage supplied from the step-down transformer to the PWM converter;
an input current detector configured to detect a current to be inputted from the step-down transformer to the PWM converter; and
an output voltage detector configured to detect a DC voltage converted by the PWM converter,
wherein the AC voltage is within a voltage range required to drive the motor,
wherein the PWM converter is supplied from the step-down transformer with a lower voltage than the voltage of the AC power source, wherein the PWM converter is operated so as to limit input and output currents or input and output power to predetermined values, and wherein the PWM converter serves to reduce the capacitance of the capacitor.

* * * * *